United States Patent
Fredriksson et al.

(10) Patent No.: US 10,821,870 B1
(45) Date of Patent: Nov. 3, 2020

(54) HEAD RESTRAINT ASSEMBLY

(71) Applicant: Ford Global Technologies, LLC, Dearborn, MI (US)

(72) Inventors: Chris Fredriksson, LaSalle (CA); Manobalaji S, Chennai (IN); Ammeswara Rao Sajja, Canton, MI (US); Abdul Raguman Thajudeen, Chennai (IN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/559,825

(22) Filed: Sep. 4, 2019

(51) Int. Cl.
  *B60N 2/888* (2018.01)
  *B60N 2/427* (2006.01)
  *B60N 2/80* (2018.01)

(52) U.S. Cl.
  CPC ......... *B60N 2/888* (2018.02); *B60N 2/42709* (2013.01); *B60N 2002/899* (2018.02)

(58) Field of Classification Search
  CPC .............. B60N 2/888; B60N 2/42709; B60N 2002/899
  USPC .................................................. 297/216.12
  See application file for complete search history.

(56) References Cited

U.S. PATENT DOCUMENTS

| 5,382,078 A | 1/1995 | Lanteri |
| 6,983,995 B1 * | 1/2006 | Veine ................... A47C 7/38 297/391 |
| 8,419,062 B2 | 4/2013 | Landini et al. |
| 9,610,874 B2 * | 4/2017 | Frotz .................. B60N 2/865 |
| 2014/0217788 A1 | 8/2014 | Norwood et al. |

FOREIGN PATENT DOCUMENTS

CN    202716766 U    2/2013

\* cited by examiner

*Primary Examiner* — Milton Nelson, Jr.
(74) *Attorney, Agent, or Firm* — David Coppiellie; Price Heneveld LLP

(57) ABSTRACT

A head restraint assembly includes a headrest bun including an interior portion and a rear outer surface. A frame member is disposed within the interior portion of the headrest bun. A support block is disposed adjacent to the frame member and includes first and second access slots disposed through a body portion thereof. A bracket includes a body portion operably coupled between the support block and the frame member. The bracket includes first and second fins rearwardly extending from the body portion of the bracket through the first and second access slots of the support block and through the rear outer surface of the headrest bun. The distal ends of the first and second fins are spaced-apart from one another and positioned outside of the interior portion of the headrest bun in assembly, and are configured to contact a glass pane of a vehicle during a deceleration event.

14 Claims, 11 Drawing Sheets

HEAD RESTRAINT ASSEMBLY

FIELD OF THE INVENTION

The present invention generally relates to a head restraint assembly, and more particularly, to a head restraint assembly having outwardly extending fins.

BACKGROUND OF THE INVENTION

Head restraint assemblies for use in confined vehicle environments are desired. The configuration of a vehicle cabin, particularly pickup truck cabins, provides for a headrest assembly to be disposed adjacent to a rear glass pane for maximizing interior space within the cabin. The head restraint of the present concept provides for an overall assembly which can dissipate energy in the form of forces realized on the headrest bun into the glass pane of a vehicle cabin. As such, the head restraint assembly includes a glass breaker in the form of a finned bracket, which allows the headrest bun to transfer energy to the glass pane and extend beyond the parameters of the glass pane during a deceleration event.

SUMMARY OF THE INVENTION

According to one aspect of the present invention, a head restraint assembly includes a headrest bun having an interior portion surrounded by an outer casing. The outer casing includes a rear outer surface. A frame member is disposed within the interior portion of the headrest bun. A support block is disposed adjacent to the frame member and includes first and second access slots disposed through a body portion thereof. A bracket includes a body portion operably coupled to the support block and the frame member. The bracket includes first and second fins rearwardly extending from the body portion of the bracket through the first and second access slots of the support block and through the rear outer surface of the headrest bun. Distal ends of the first and second fins are spaced-apart from one another and positioned outside of the interior portion of the headrest bun.

According to another aspect of the present invention, a head restraint assembly includes a headrest bun having an interior portion and a rear outer surface. A frame member is disposed within the interior portion of the headrest bun. A support block includes a body portion with at least one access slot disposed therethrough. A bracket is operably coupled to the support block and the frame member within the interior portion of the headrest bun. The bracket includes at least one fin extending rearwardly from a body portion of the bracket and through the at least one access slot of the support block. A distal end of the at least one fin is positioned outside of the interior portion of the headrest bun.

According to another aspect of the present invention, a head restraint assembly includes a headrest bun having an interior portion and a rear outer surface. A frame member is disposed within the interior portion of the headrest bun. A bracket includes a body portion disposed within the interior portion of the headrest bun. The bracket is operably coupled to the frame member and further includes at least one fin extending rearwardly from the body portion of the bracket through the rear outer surface of the headrest bun.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
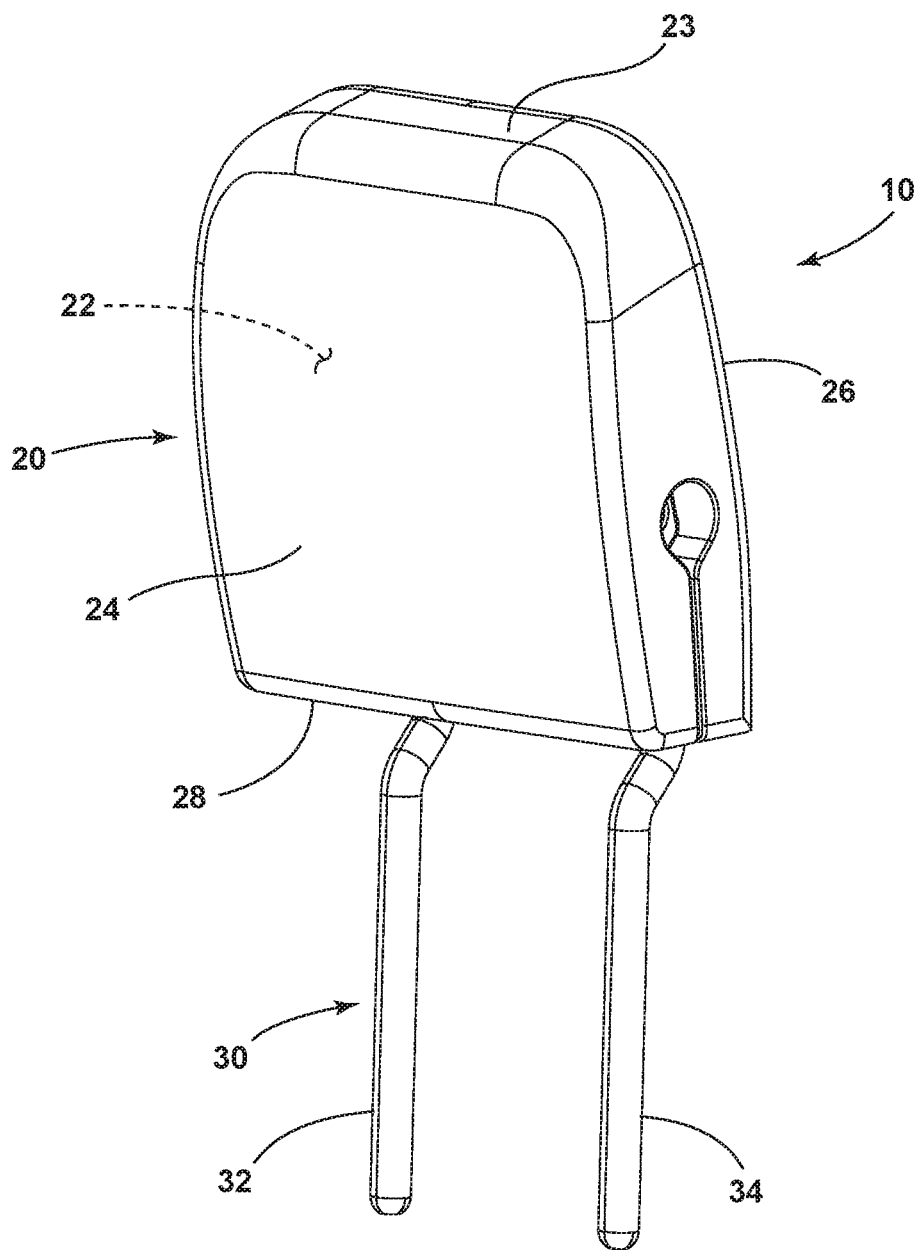
FIG. 1 is a front perspective view of a head restraint assembly.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a head restraint assembly 10 is shown having a headrest bun 20 within an interior portion 22. The interior portion 22 is surrounded by an outer casing 23 which defines front and rear outer surfaces 24, 26, and a lower surface 28 of the headrest bun 20. The outer casing 23 is contemplated to be comprised of flexible materials, such as leather, vinyl or cloth to accommodate a cushioned front portion of the headrest bun 20. The outer casing 23 may also include rigid materials, such as polymeric materials, along with the flexible materials. As further shown in FIG. 1, a support member 30 includes first and second support posts 32, 34 which are configured to be received within a seatback of a vehicle seat assembly. In this way, the head restraint assembly 10 can be supported on a vehicle seat and may be vertically adjustable therefrom.

Figure 2:
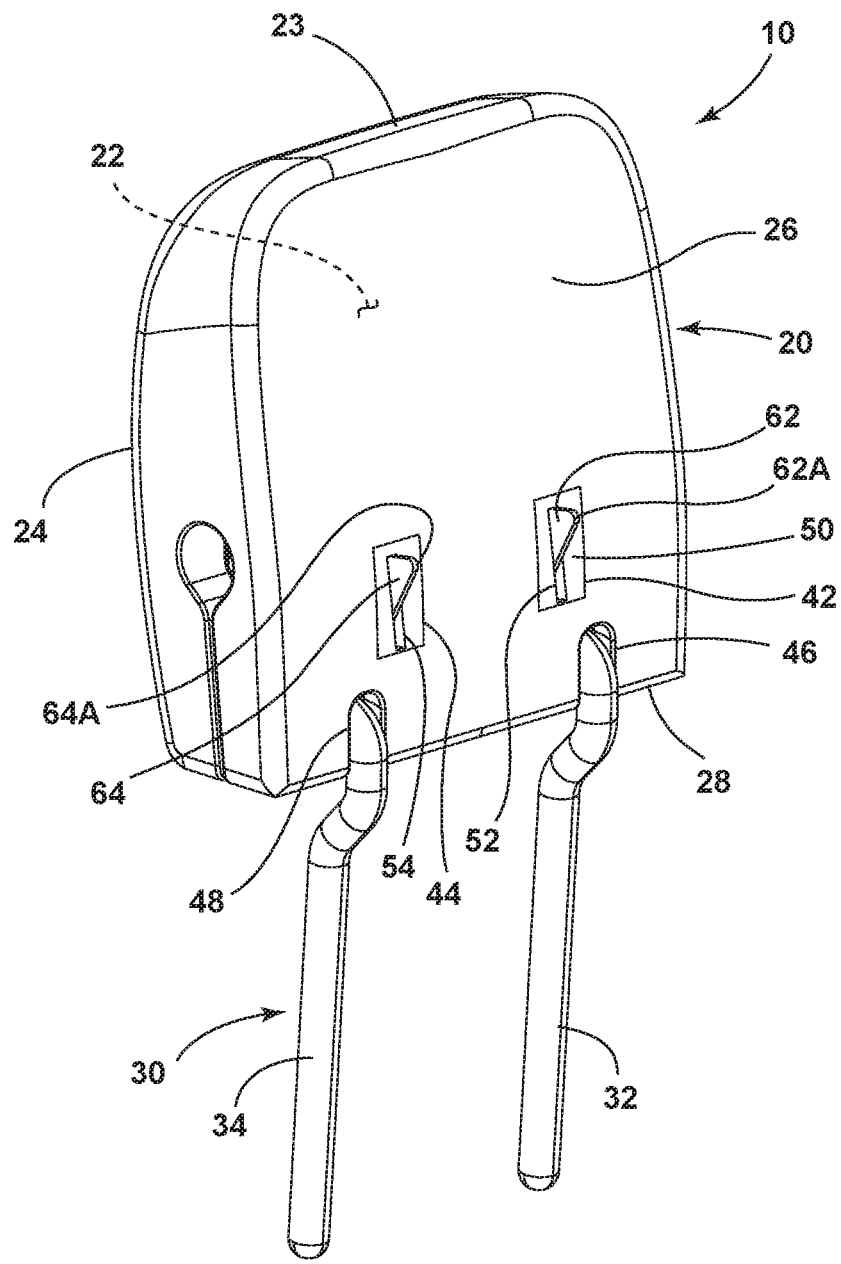
FIG. 2 is a rear perspective view of the head restraint assembly of FIG. 1.

Referring now to FIG. 2, the head restraint assembly 10 is shown with the rear outer surface 26 of the headrest bun 20 being shown as defined by the outer casing 23. In the embodiment shown in FIG. 2, the rear outer surface 26 of the headrest bun 20 includes first and second access apertures 42, 44 which align with access slots 52, 54, respectively, of a support block 50 which is disposed within the interior portion 22 of the headrest bun 20. Extending outwardly from the access slots 52, 54, first and second fins 62, 64 are positioned, such that distal ends 62A, 64A, thereof, extend outwardly from the rear outer surface 26 of the headrest bun 20 through access apertures 42, 44. As further shown in FIG. 2, the rear outer surface 26 of the headrest bun 20 includes first and second openings 46, 48 through which first and second support posts 32, 34 enter the interior portion 22 of the headrest bun 20.

Figure 3:
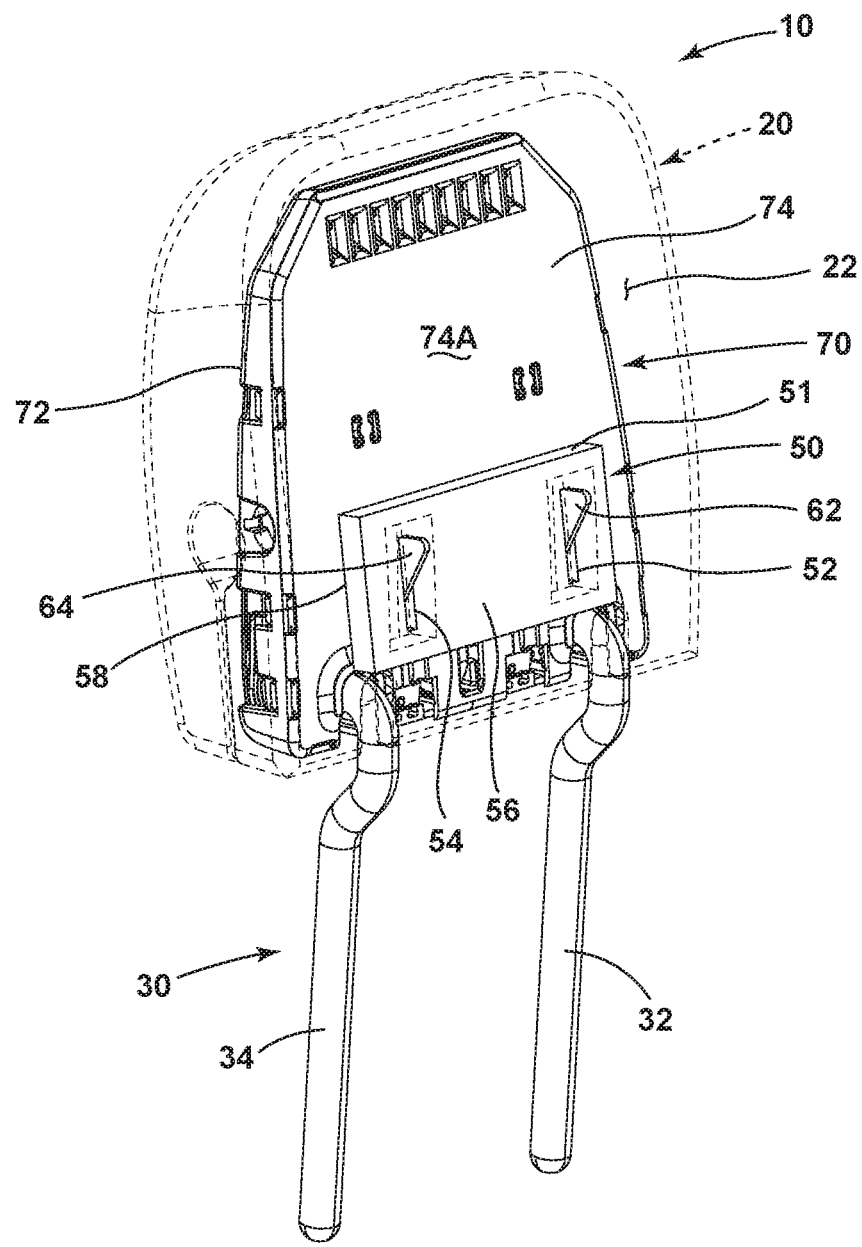
FIG. 3 is a rear perspective view of the head restraint assembly of FIG. 2 with a headrest bun thereof shown in phantom to reveal a support member coupled to an internal frame member within an interior portion of the headrest bun.

Referring now to FIG. 3, the headrest bun 20 is shown in phantom to reveal a frame member 70 disposed within the interior portion 22 of the headrest bun 20, such that the frame member 70 may be referred to herein as an internal frame member. The frame member 70 is contemplated to be a rigid part providing structural support for the headrest bun 20. The frame member 70 includes a front portion 72 and a rear portion 74 which couple to one another around an upper portion 36 (FIG. 5) of the support member 30 which interconnects the first and second support posts 32, 34. In this way, the frame member 70 is operably coupled to the upper portion 36 of the support member 30 within the interior portion 22 of the headrest bun 20 and may pivot about the upper portion 36 of the support member 30. As further shown in FIG. 3, the support block 50 is disposed adjacent to the frame member 70 and is specifically positioned in the embodiment of FIG. 3 adjacent to a rear surface 74A of the frame member 70. The support block 50 includes a body portion 51 through which the first and second access slots 52, 54 are disposed. Thus, the body portion 51 of the support block 50 is generally defined between an outer surface 56 and an inner surface 58 of the support block 50. The support block 50 may be comprised of a foam material, and further, may be comprised of a rigid high-density foam material to provide support for the outwardly extending first and second fins 62, 64.

Figure 4A:
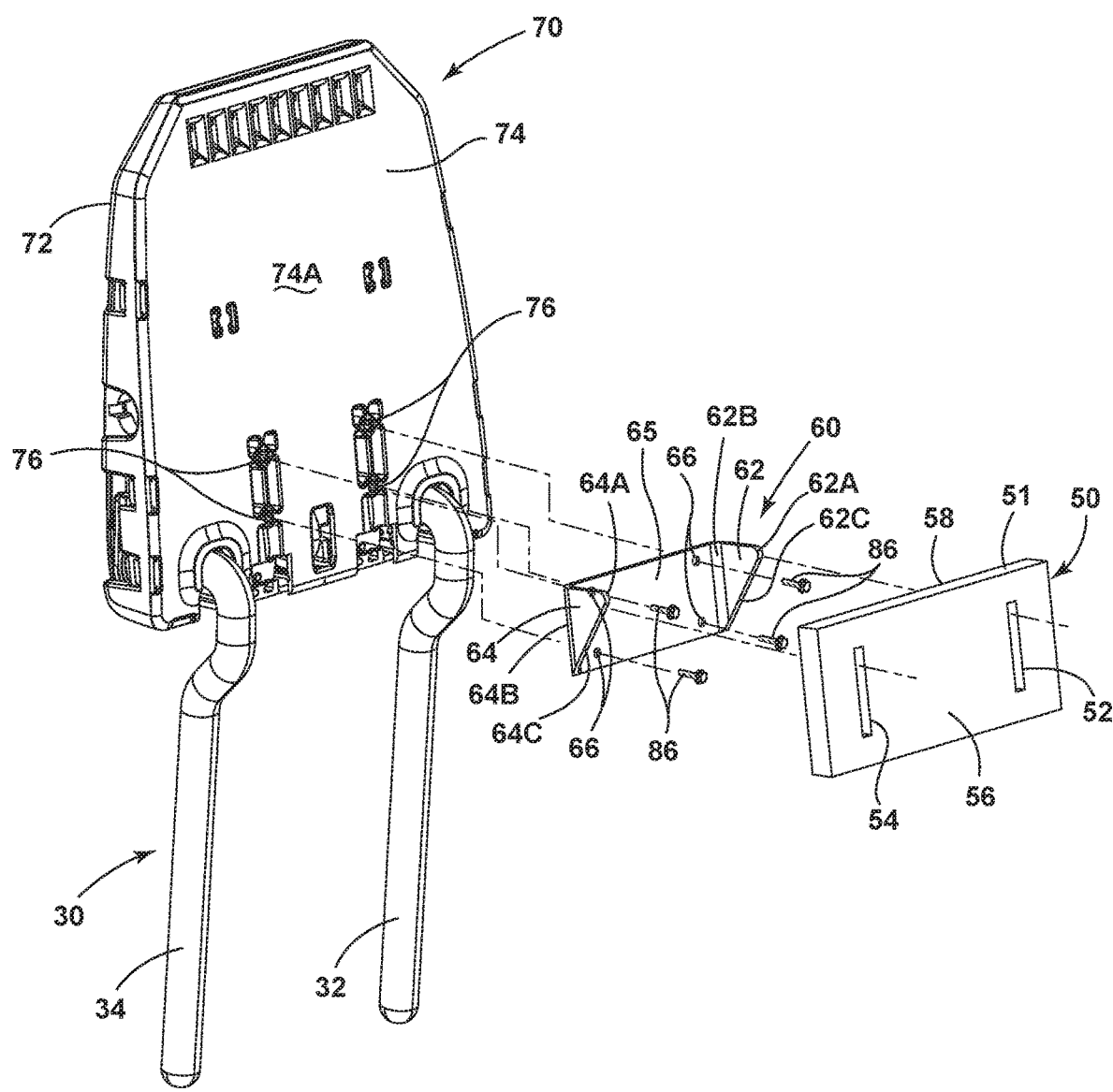
FIG. 4A is an exploded rear perspective view of the head restraint assembly of FIG. 3 with the headrest bun removed, and showing a support block and bracket exploded away from the internal frame member.
Figure 4B:
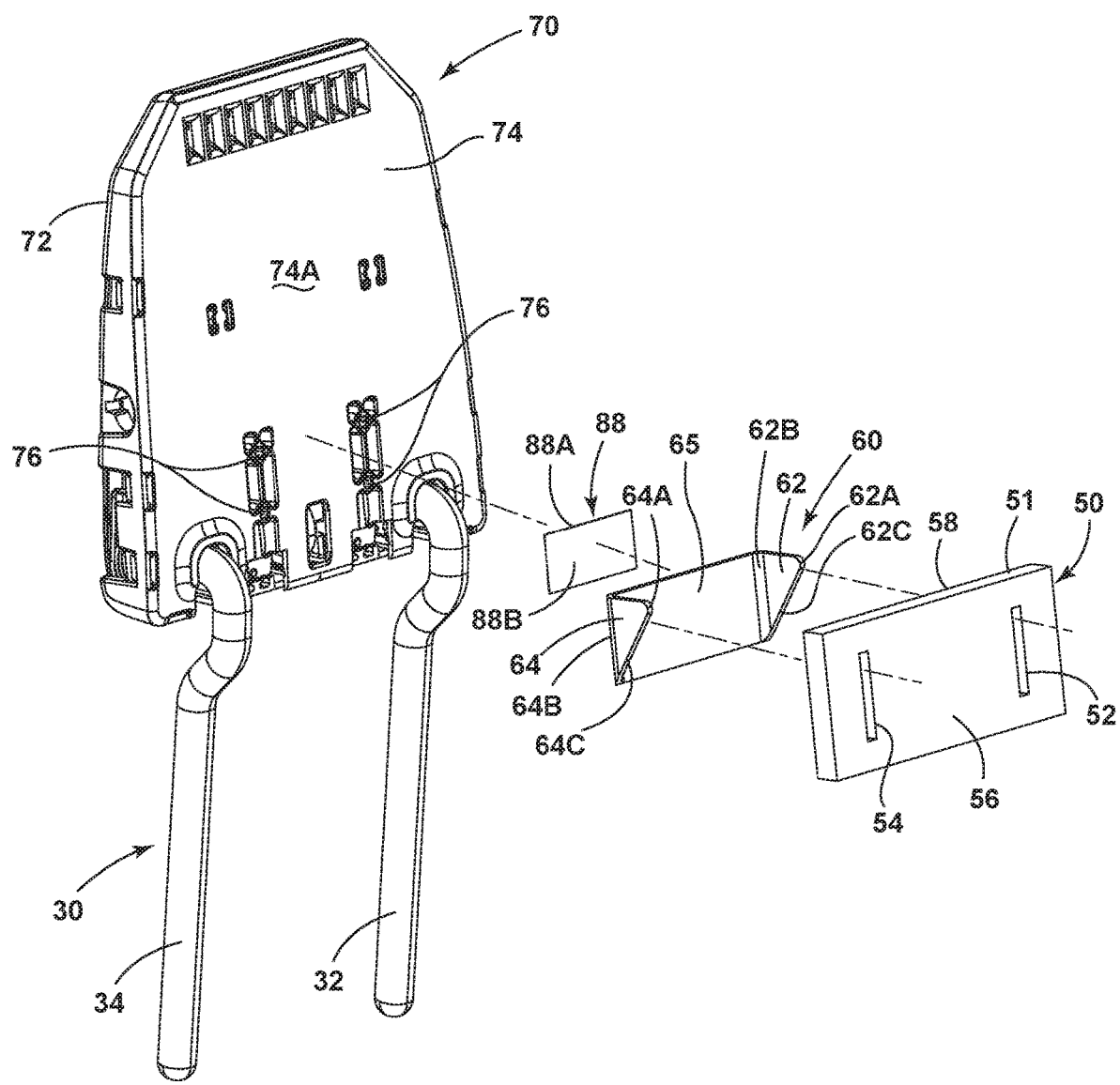
FIG. 4B is an exploded rear perspective view of the head restraint assembly of FIG. 3 with the headrest bun removed, and showing the support block, an adhesive strip, and the bracket exploded away from the internal frame member.

Referring now to FIG. 4A, the support block 50, and a bracket 60 are shown exploded away from the rear surface 74A of the frame member 70. With the support block 50 and the bracket 60 removed from the frame member 70, mounting apertures 76 of the frame member 70 are revealed. The bracket 60 includes a body portion 65 which is configured to be operably coupled to the rear surface 74A of the frame member 70. In the embodiment shown in FIG. 4A, the body portion 65 of the bracket 60 includes mounting apertures 66 through which fasteners 86 are received. The fasteners 86 are further contemplated to couple to the mounting aperture 76 of the frame member 70 for securely mounting the bracket 60 to the frame member 70. Other methods of mounting the bracket 60 to the frame member 70 are also contemplated, such as adhering the bracket 60 to the rear surface 74A of the frame member 70 using an adhesive strip 88, as shown in FIG. 4B. The bracket 60 is contemplated to be comprised of a metal material or may be comprised of a rigid polymeric material. In the embodiment shown in FIG. 4A, the bracket 60 includes first and second fins 62, 64 which rearwardly extend from the body portion 65 of the bracket 60. It is contemplated that the bracket 60 may include more or less fins than shown in the embodiment of FIG. 4A. The first and second fins 62, 64 shown in FIG. 4A include base portions 62B, 64B and distal ends 64A, 62A. In this way, the first and second fins 62, 64 include body portions 62C, 64C, respectively, that taper from the respective base portions 62B, 64B to the respective distal ends 62A, 64A. In the embodiment shown in FIG. 4A, the first and second fins 62, 64 extend outwardly from opposite ends of the body portion 65 of the bracket 60. However, the first and second fins 62, 64 may be disposed at any position along the bracket 60.

Figure 5:
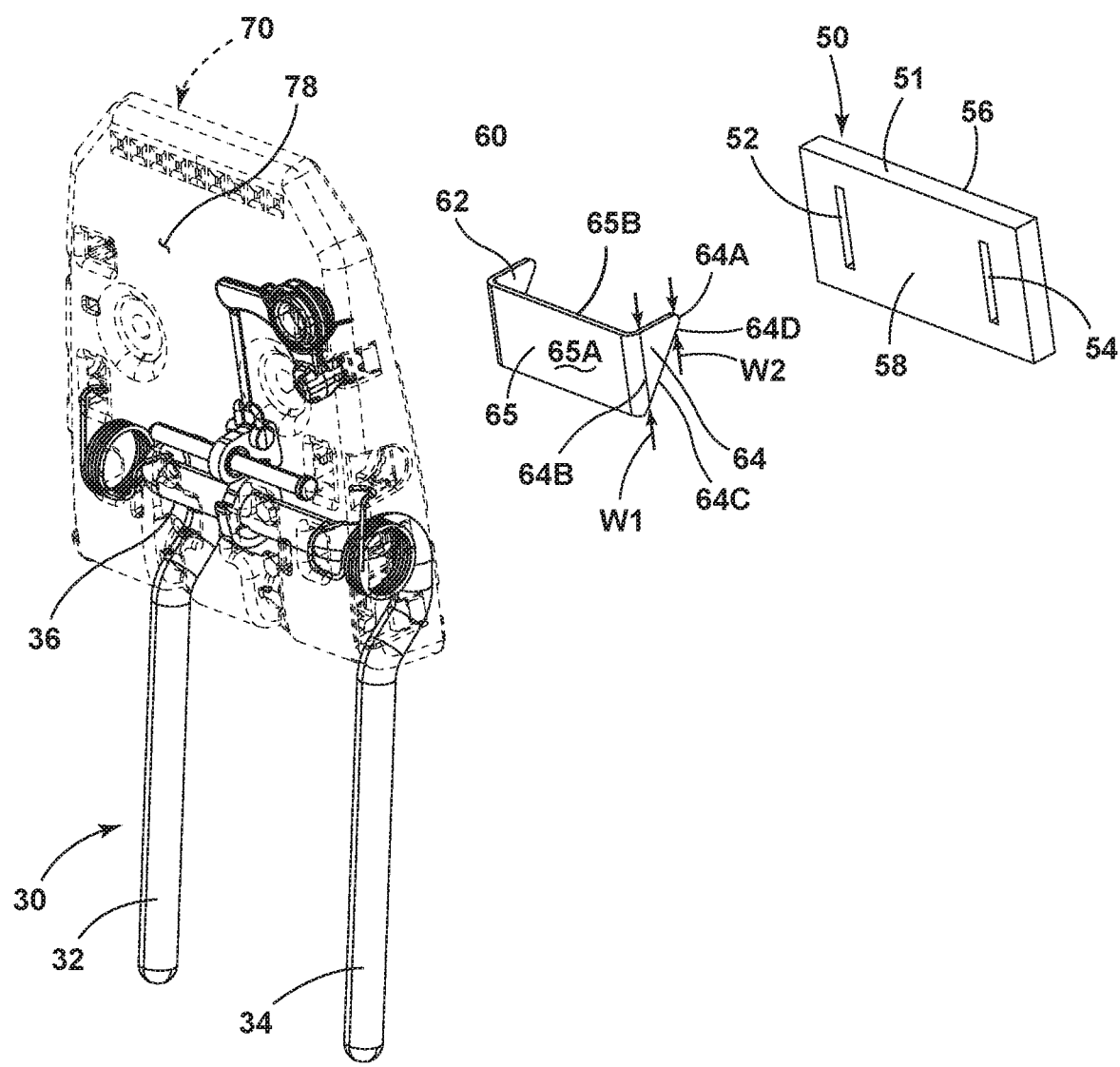
FIG. 5 is an exploded front perspective view of the internal frame member and support member of FIG. 4B with the internal frame member shown in phantom.
Figure 6:
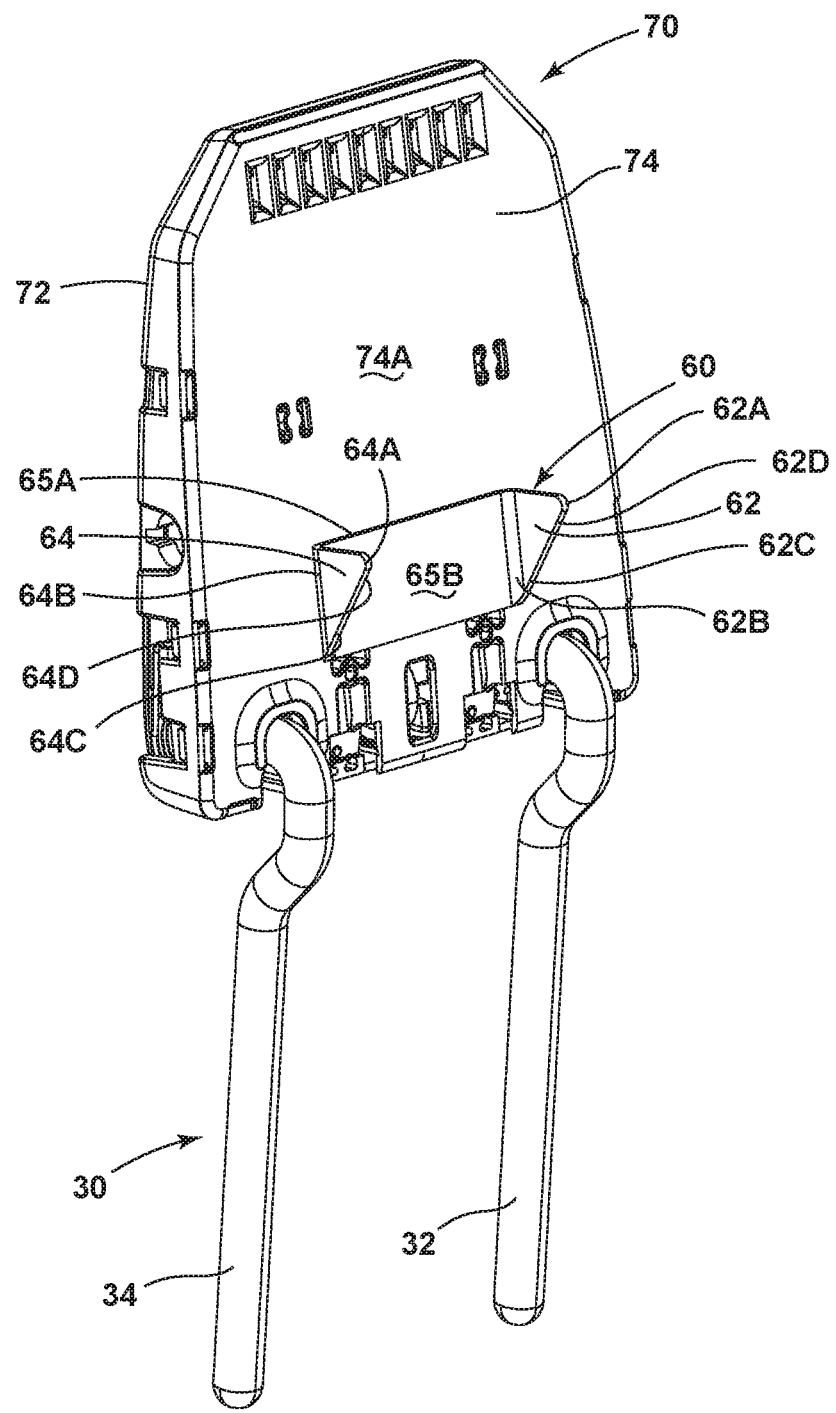
FIG. 6 is a rear perspective view of the internal frame member and support member of FIG. 4B with the bracket coupled to a rear surface of the internal frame member.
Figure 7:
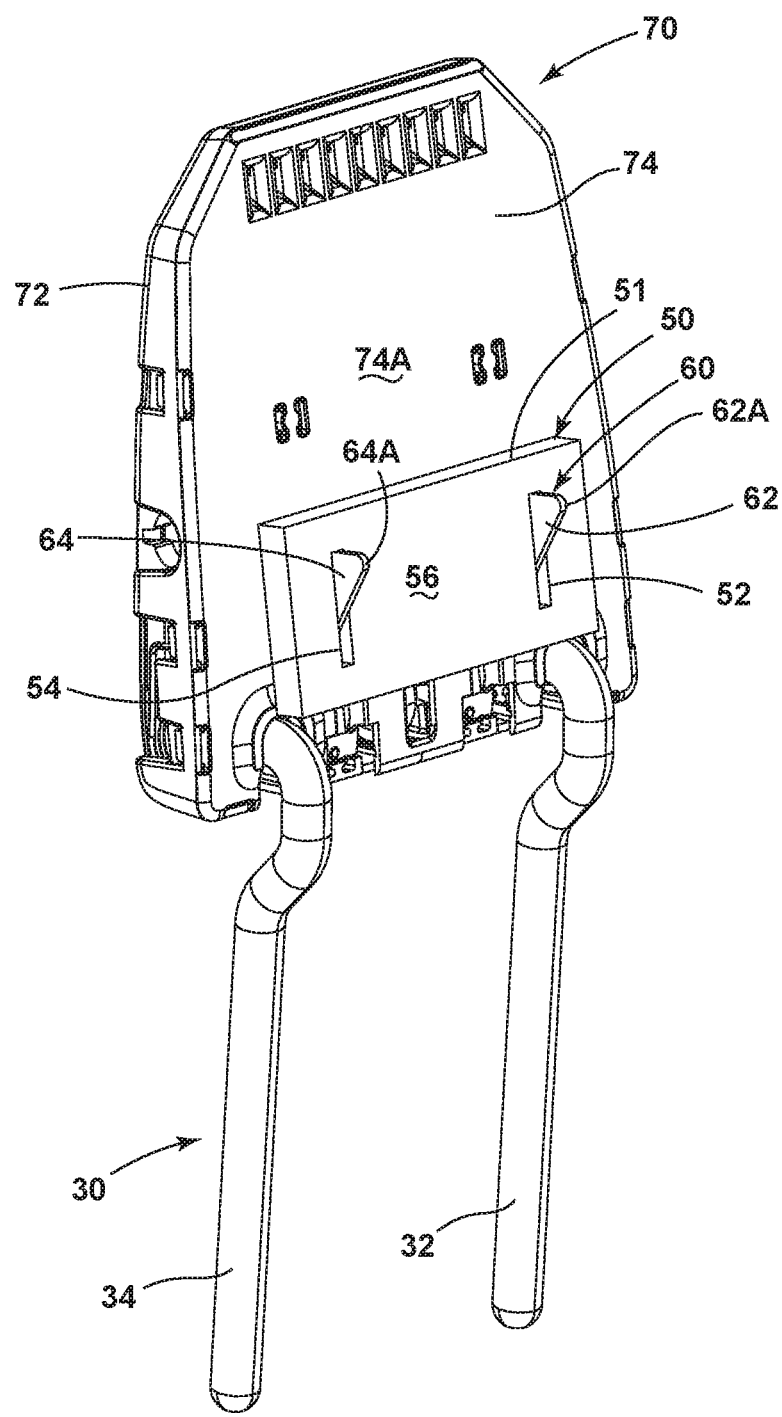
FIG. 7 is a rear perspective view of the internal frame member and support member of FIG. 6 with the bracket and support block disposed on the rear surface of the internal frame member.

Referring now to FIG. 5, the frame member 70 is shown in phantom to reveal an interior portion 78 in which an upper portion 36 of the support member 30 is disposed and operably coupled with the frame member 70. The bracket 60, in the embodiment of FIG. 5 includes the body portion 65 which defines an elongate plate having an inner surface 65A, which is configured to abut the rear surface 74A, of the frame member 70, as best shown in FIG. 6. The body portion 65 of the bracket 60 further includes an outer surface 65B which is configured to abut the inner surface 58 of the support block 50 when coupled thereto, as best shown in FIG. 7. As shown in FIG. 4B, the adhesive strip 88 includes an outer surface 88A and an inner surface 88B. In assembly, the inner surface 88B of the adhesive strip 88 adheres to the rear surface 74A of the frame member 70, while the outer surface 88A of the adhesive strip 88 adheres to the inner surface 65A of the bracket 60 to hold the bracket 60 in place on the frame member 70. Thus, the adhesive strip 88 is contemplated to be a dual-sided adhesive strip. It is contemplated that the first and second fins 62, 64 are formed by bending a metal material of which the bracket 60 is comprised, such that the first and second fins 62, 64 rearwardly extend from the body portion 65. Thus, the first and second fins 62, 64 are contemplated to be mirror images of one another, such that the description of one fin further describes the other. In FIG. 5, the second fin 64 is shown with the base portion 64B have a first width W1 that is greater than a second width W2 of the second fin 64 at the distal end 64A thereof. This is due to the tapered body portion 64C of the second fin 64 which has an angled edge surface 64D extending from the base portion 64B to the distal end 64A to form a point at the distal end 64A. The same is true for first fin 62 having angled edge surface 62D shown in FIG. 6. Thus, in the tapered configuration of the fins 62, 64, the first width W1 is greater than the second width W2, and vice versa.

Referring now to FIG. 6, the bracket 60 is shown operably coupled to the rear surface 74A of the frame member 70, and is contemplated to be held thereto using the adhesive strip 88 shown in FIG. 4B. Specifically, the inner surface 65A of the bracket 60 is contemplated to be abutting the rear surface 74A of the frame member 70. In this way, the first and second fins 62, 64 of the bracket 60 outwardly extend from the frame member 70, as coupled thereto. The coupling of the bracket 60 and the frame member 70 is contemplated to be completely contained within the interior portion 22 of the headrest bun 20, as best shown in FIG. 8.

Referring now to FIG. 7, the support block 50 is shown coupled to the bracket 60, such that the first and second fins 62, 64 of the bracket 60 rearwardly extend through the first and second access slots 52, 54 of the support block 50. The first and second fins 62, 64 not only extend through the access slots 52, 54 of the support block 50, but are further configured to have the distal ends 62A, 64A, thereof, extended outwardly from the interior portion 22 of the headrest bun 20, as best shown in FIG. 8. In this way, the distal ends 62A, 64A of the first and second fins 62, 64 are spaced-apart from one another and positioned outside of the interior portion 22 of the headrest bun 20 in assembly.

Figure 8:
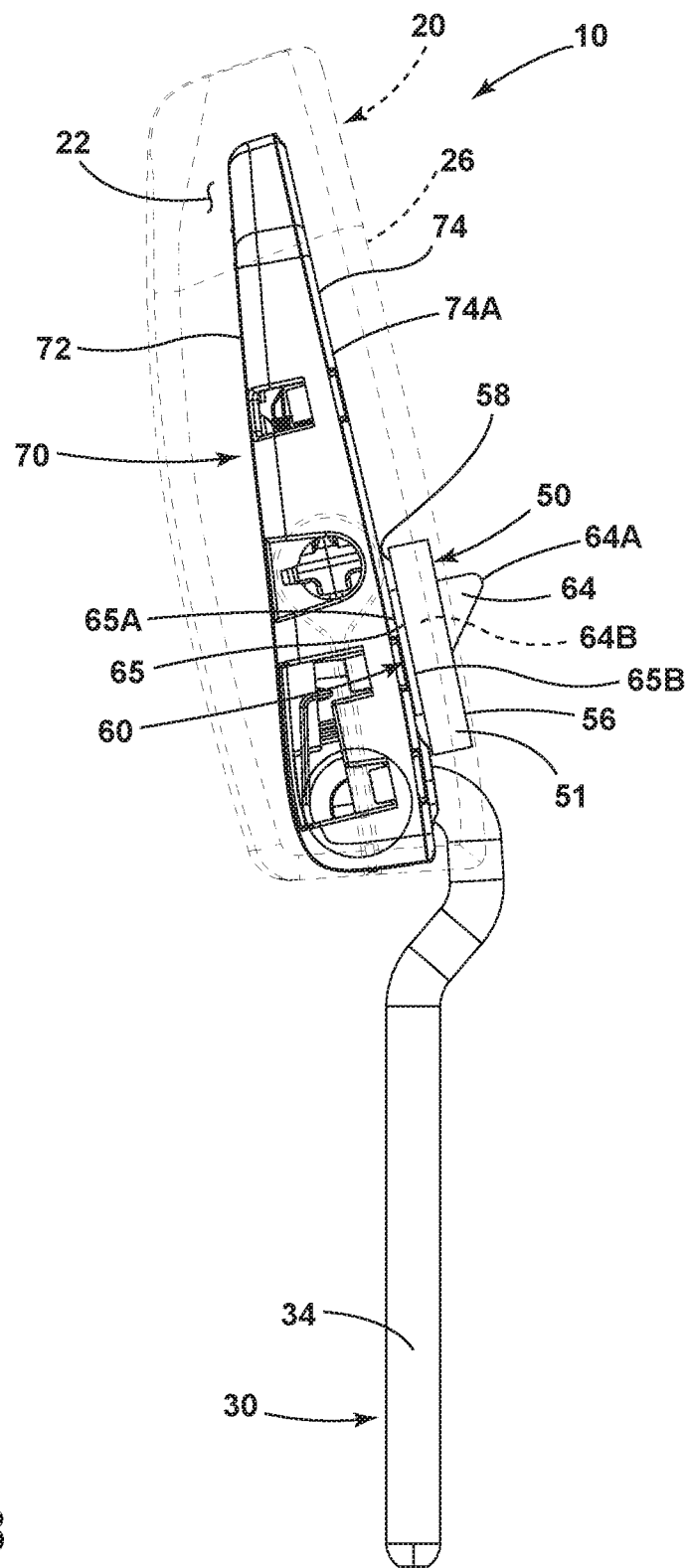
FIG. 8 is a side elevation view of the internal frame member and support member of FIG. 7 with the headrest bun shown in phantom.

Referring now to FIG. 8, the distal end 64A of second fin 64 is shown extending outwardly through the rear outer surface 26 of the headrest bun 20, such that the distal end 64A of the second fin 64 is disposed outside of the interior portion 22 of the headrest bun 20. The base portion 64B of second fin 64 is shown in phantom as being disposed through the body portion 51 of the support block 50. In this way, the base portion 64B of the second fin 64 is received in the second access slot 54 of the support block 50. The same is true for the configuration of the first fin 62 which is not shown in FIG. 8. In this way, the body portion 51 of the support block 50 surrounds the base portion 64B of the second fin 64, and is further contemplated to surround the base portion 62B of the first fin 62. As further shown in FIG. 8, the body portion 65 of the bracket 60 includes the inner surface 65A thereof abutting the rear surface 74A of the frame member 70. Further, the outer surface 65B of the bracket 60 is shown abutting the inner surface 58 of the support block 50. As shown in FIG. 8, the frame member 70 and the support block 50 are shown disposed within the interior portion 22 of the headrest bun 20 in their entireties. The coupling of the support block 50, the bracket 60 and the frame member 70 is also completely contained within the interior portion 22 of the headrest bun 20. The distal end 64A of the second fin 64 is shown as extending outwardly from the interior portion 22 of the headrest bun 20, such that the distal end 64A is outwardly accessible from the headrest bun 20 in assembly. In this way, the distal end 62A, 64A of the bracket 60 are contemplated to be outwardly exposed relative to the headrest bun 20, as best shown in FIG. 2.

Figure 9:
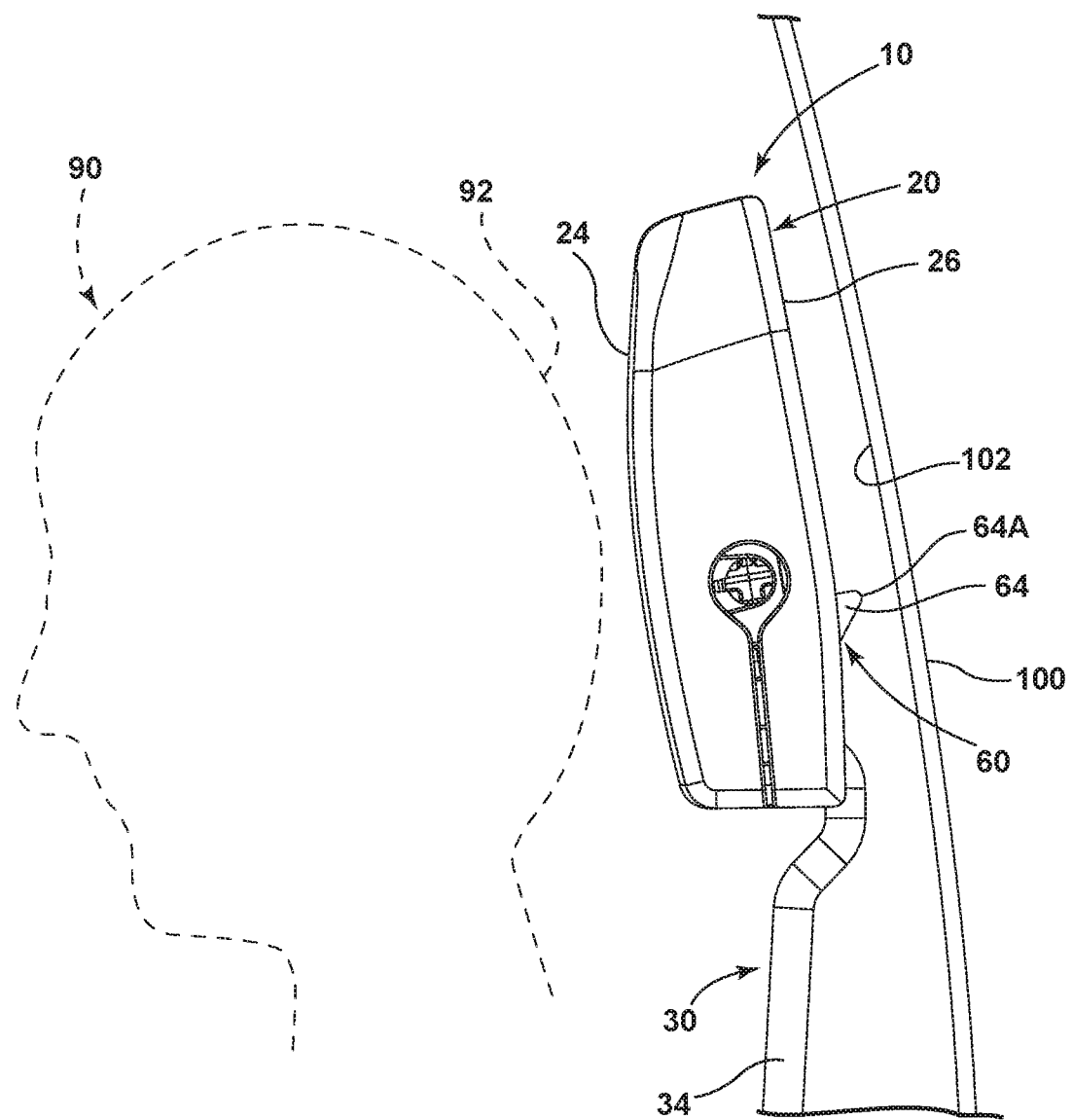
FIG. 9 is a side elevation of the head restraint assembly of FIG. 1 disposed adjacent to a rear glass pane of a vehicle with a vehicle occupant disposed adjacent thereto.

Referring now to FIG. 9, a vehicle occupant 90 is shown having a head 92 disposed adjacent to and spaced-apart from the head restraint assembly 10 of the present concept. Specifically, the head 92 of the vehicle occupant 90 is shown spaced-apart from the front surface 24 of the headrest bun 20, which is contemplated to be a cushioned front portion. The rear outer surface 26 of the headrest bun 20 is shown spaced-apart from a glass pane 100 having an inner surface 102. The glass pane 100 is contemplated to be a rear glass part of a truck cabin, such that the head restraint 10 is contemplated to be used in conjunction with a seat assembly disposed in a rear part of a truck cabin, wherein the configuration of the cabin provides for a headrest assembly to be disposed adjacent to a glass pane for maximizing interior space within the cabin. The spacing between the rear outer surface 26 of the headrest bun 20 and the inner surface 102 of the glass pane 100 may be less than 30 mm.

Figure 10:
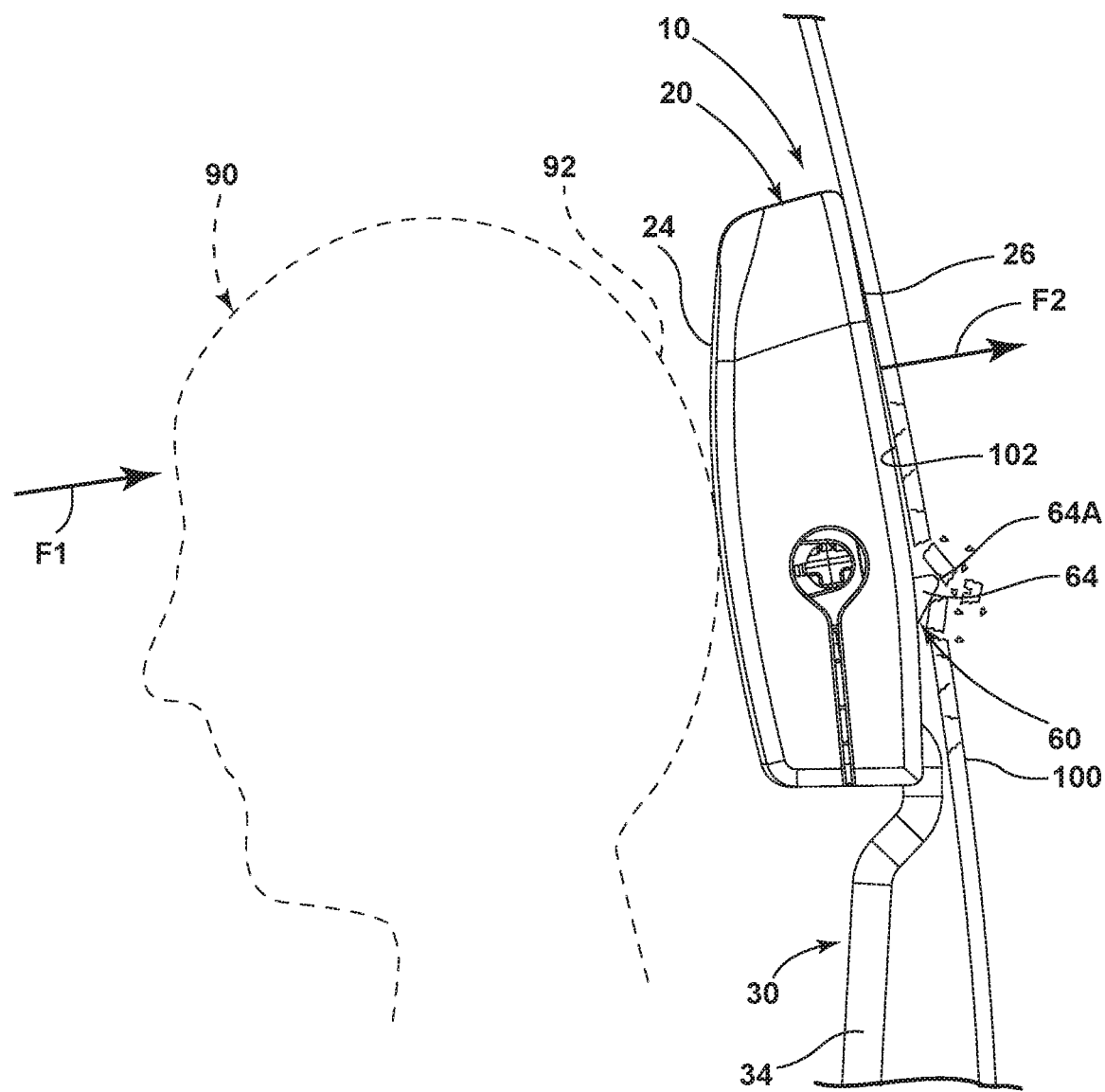
FIG. 10 is a side elevation of the head restraint assembly of FIG. 9 with a fin of the head restraint assembly contacting the rear glass pane of the vehicle.

Referring now to FIG. 10, the vehicle occupant head 92 is shown in contact with the front surface 24 of the headrest bun 20 under a force F1 which is translated to the headrest bun 20 as a force F2. The force F2 has moved to the head restraint assembly 10 rearwardly towards the glass pane 100, such that the distal end 64A of the second fin 64 is shown having contacted the glass pane 100 at the inner surface 102 thereof and broken the glass pane 100. In this way, the head restraint 10 of the present concept provides for an overall assembly which can dissipate energy in the form of forces realized on the headrest bun 20 into the glass pane 100 of a vehicle cabin. As such, the head restraint assembly 10 of the present concept includes a glass breaker in the form of the bracket 60, and fins 62, 64 thereof, which allows the headrest bun 20 to transfer energy to the glass pane 100 and extend beyond the parameters of the glass pane 100 during a deceleration event.

According to one aspect of the present invention, a head restraint assembly includes a headrest bun having an interior portion surrounded by an outer casing. The outer casing includes a rear outer surface. A frame member is disposed within the interior portion of the headrest bun. A support block is disposed adjacent to the frame member and includes first and second access slots disposed through a body portion thereof. A bracket includes a body portion operably coupled to the support block and the frame member. The bracket includes first and second fins rearwardly extending from the body portion of the bracket through the first and second access slots of the support block and through the rear outer surface of the headrest bun. Distal ends of the first and second fins are spaced-apart from one another and positioned outside of the interior portion of the headrest bun.

Embodiments of the first aspect of the invention can include any one or a combination of the following features:
  the first and second fins include base portions received in the first and second access slots, respectively, such that the body portion of the support bracket surrounds the base portions of the first and second fins;
  the first and second fins include body portions which tapper from the base portions to the distal ends;
  the first and second fins are disposed at opposite ends of the body portion of the bracket.
  the bracket is comprised of a metal material;
  the bracket is operably coupled to a rear surface of the frame member;
  the body portion of the bracket defines an elongate plate having an inner surface abutting a rear surface of the frame member; and
  the elongate plate further includes an outer surface abutting an inner surface of the support block.

According to another aspect of the present invention, a head restraint assembly includes a headrest bun having an interior portion and a rear outer surface. A frame member is disposed within the interior portion of the headrest bun. A support block includes a body portion with at least one access slot disposed therethrough. A bracket is operably coupled to the support block and the frame member within the interior portion of the headrest bun. The bracket includes at least one fin extending rearwardly from a body portion of the bracket and through the at least one access slot of the support block. A distal end of the at least one fin is positioned outside of the interior portion of the headrest bun.

Embodiments of the second aspect of the invention can include any one or a combination of the following features:
  the support block surrounds a base portion of the at least one fin within the interior portion of the headrest bun;
  the at least one fin includes a body portion which tappers from the base portion to the distal end;
  the support block is comprised of a rigid foam material; and
  the bracket is comprised of a metal material.

According to another aspect of the present invention, a head restraint assembly includes a headrest bun having an interior portion and a rear outer surface. A frame member is disposed within the interior portion of the headrest bun. A bracket includes a body portion disposed within the interior portion of the headrest bun. The bracket is operably coupled to the frame member and further includes at least one fin extending rearwardly from the body portion of the bracket through the rear outer surface of the headrest bun.

Embodiments of the third aspect of the invention can include any one or a combination of the following features:

- a distal end of the at least one fin is positioned outside of the interior portion of the headrest bun;
- the at least one fin includes at least one angled edge surface to define a point at the distal end of the at least one fin;
- the at least one fin includes a body portion having a base portion of a first width, and further wherein the distal end includes a second width that is less than the first width of the base portion;
- a support block surrounding the base portion of the at least one fin within the interior portion of the headrest bun;
- an inner surface of the support block abuts an outer surface of the body portion of the bracket; and
- the rear outer surface of the headrest bun includes at least one access aperture disposed therethrough, and further wherein the at least one fin of the bracket extends through the at least one access aperture of the rear outer surface of the headrest bun.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A head restraint assembly, comprising:
a headrest bun having an interior portion surrounded by an outer casing, wherein the outer casing includes a rear outer surface;
a frame member disposed within the interior portion of the headrest bun;
a support block disposed adjacent to the frame member and having first and second access slots disposed through a body portion thereof; and
a bracket having a body portion operably coupled to the support block, wherein the bracket includes first and second fins rearwardly extending from the body portion of the bracket through the first and second access slots of the support block and through the rear outer surface of the headrest bun, wherein distal ends of the first and second fins are spaced-apart from one another and positioned outside of the interior portion of the headrest bun.

2. The head restraint assembly of claim 1, wherein the first and second fins include base portions received in the first and second access slots, respectively, such that the body portion of the support block surrounds the base portions of the first and second fins.

3. The head restraint assembly of claim 2, wherein the first and second fins include body portions which taper from the base portions to the distal ends.

4. The head restraint assembly of claim 3, wherein the first and second fins are disposed at opposite ends of the body portion of the bracket.

5. The head restraint assembly of claim 4, wherein the bracket is comprised of a metal material.

6. The head restraint assembly of claim 1, wherein the bracket is operably coupled to a rear surface of the frame member.

7. The head restraint assembly of claim 1, wherein the body portion of the bracket defines an elongate plate having an inner surface abutting a rear surface of the frame member.

8. The head restraint assembly of claim 7, wherein the elongate plate further includes an outer surface abutting an inner surface of the support block.

9. A head restraint assembly, comprising:
a headrest bun having an interior portion and a rear outer surface;
a frame member disposed within the interior portion of the headrest bun;
a support block having a body portion with at least one access slot disposed therethrough, wherein the support block surrounds a base portion of the at least one fin within the interior portion of the headrest bun, and further wherein the support block is comprised of a rigid foam material; and
a bracket operably coupled to the support block and the frame member within the interior portion of the headrest bun, wherein the bracket includes at least one fin extending rearwardly from a body portion of the bracket and through the at least one access slot of the support block, such that a distal end of the at least one fin is positioned outside of the interior portion of the headrest bun.

10. The head restraint assembly of claim 9, wherein the bracket is comprised of a metal material.

11. The head restraint assembly of claim 9, wherein the at least one fin includes a body portion which tapers from the base portion to the distal end.

12. A head restraint assembly, comprising:
a headrest bun having an interior portion and a rear outer surface;
a frame member disposed within the interior portion of the headrest bun;
a bracket operably coupled to the frame member and having a body portion disposed within the interior portion of the headrest bun, wherein the bracket further includes at least one fin extending rearwardly from the body portion of the bracket through the rear outer surface of the headrest bun, wherein a distal end of the at least one fin is positioned outside of the interior portion of the headrest bun, and the at least one fin includes a body portion having a base portion of a first width, and further wherein the distal end includes a second width that is less than the first width of the base portion; and
a support block surrounding the base portion of the at least one fin within the interior portion of the headrest bun, wherein an inner surface of the support block abuts an outer surface of the body portion of the bracket.

13. The head restraint assembly of claim 12, wherein the at least one fin includes at least one angled edge surface to define a point at the distal end of the at least one fin.

14. The head restraint assembly of claim 12, wherein the rear outer surface of the headrest bun includes at least one access aperture disposed therethrough, and further wherein the at least one fin of the bracket extends through the at least one access aperture of the rear outer surface of the headrest bun.

* * * * *